(12) United States Patent
Kinter et al.

(10) Patent No.: US 8,392,663 B2
(45) Date of Patent: Mar. 5, 2013

(54) COHERENT INSTRUCTION CACHE UTILIZING CACHE-OP EXECUTION RESOURCES

(75) Inventors: Ryan C. Kinter, Seattle, WA (US); Darren M. Jones, Los Altos, CA (US); Matthias Knoth, San Jose, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 683 days.

(21) Appl. No.: 12/332,291

(22) Filed: Dec. 10, 2008

(65) Prior Publication Data

US 2009/0157981 A1    Jun. 18, 2009

Related U.S. Application Data

(60) Provisional application No. 61/013,265, filed on Dec. 12, 2007.

(51) Int. Cl.
*G06F 9/30* (2006.01)
*G06F 12/10* (2006.01)
*G06F 13/00* (2006.01)
*G06F 15/16* (2006.01)

(52) U.S. Cl. ............ 711/141; 711/203; 711/E12.026; 711/E12.058; 712/205; 712/E9.016

(58) Field of Classification Search .................. None
See application file for complete search history.

(56) References Cited

U.S. PATENT DOCUMENTS

| | | | |
|---|---|---|---|
| 5,406,504 A * | 4/1995 | Denisco et al. | 711/141 |
| 5,530,933 A * | 6/1996 | Frink et al. | 711/141 |
| 5,551,005 A * | 8/1996 | Sarangdhar et al. | 711/145 |
| 5,715,428 A | 2/1998 | Wang et al. | |
| 5,889,779 A * | 3/1999 | Lincoln | 370/412 |
| 6,073,217 A | 6/2000 | Mahalingaiah et al. | |
| 6,088,771 A | 7/2000 | Steely, Jr. et al. | |
| 6,202,127 B1 * | 3/2001 | Dean et al. | 711/118 |
| 6,216,200 B1 | 4/2001 | Yeager | |
| 6,266,755 B1 | 7/2001 | Yeager | |
| 6,393,500 B1 | 5/2002 | Thekkath | |
| 6,418,517 B1 * | 7/2002 | McKenney et al. | 711/151 |
| 6,490,642 B1 | 12/2002 | Thekkath et al. | |
| 6,493,776 B1 | 12/2002 | Courtright et al. | |

(Continued)

FOREIGN PATENT DOCUMENTS

WO    WO 95/30954 A1 * 11/1995
WO    WO 2007096572 A1 * 8/2007

OTHER PUBLICATIONS

U.S. Appl. No. 10/783,960, filed Feb. 20, 2004, Petersen et al.

(Continued)

*Primary Examiner* — Jasmine Song
*Assistant Examiner* — Daniel Bernard
(74) *Attorney, Agent, or Firm* — Kilpatrick Townsend & Stockton LLP; Ardeshir Tabibi

(57) ABSTRACT

A multiprocessor system maintains cache coherence among processors in a coherent domain. Within the coherent domain, a first processor can receive a command to perform a cache maintenance operation. The first processor can determine whether the cache maintenance operation is a coherent operation. For coherent operations, the first processor sends a coherent request message for distribution to other processors in the coherent domain and can cancel execution of the cache maintenance operation pending receipt of intervention messages corresponding to the coherent request. The intervention messages can reflect a global ordering of coherence traffic in the multiprocessor system and can include instructions for maintaining a data cache and an instruction cache of the first processor. Cache maintenance operations that are determined to be non-coherent can be executed at the first processor without sending the coherent request.

20 Claims, 6 Drawing Sheets

U.S. PATENT DOCUMENTS

| | | | |
|---|---|---|---|
| 6,507,862 B1 | 1/2003 | Joy et al. | |
| 6,594,728 B1 | 7/2003 | Yeager | |
| 6,604,159 B1 | 8/2003 | Thekkath et al. | |
| 6,651,156 B1 | 11/2003 | Courtright et al. | |
| 6,681,283 B1 | 1/2004 | Thekkath et al. | |
| 6,721,813 B2 | 4/2004 | Owen et al. | |
| 6,732,208 B1 | 5/2004 | Alsaadi et al. | |
| 6,976,155 B2 | 12/2005 | Drysdale et al. | |
| 7,003,630 B1 | 2/2006 | Kissell | |
| 7,017,025 B1 | 3/2006 | Kissell | |
| 7,047,372 B2 | 5/2006 | Zeitler et al. | |
| 7,107,567 B1 | 9/2006 | LeBlanc | |
| 7,162,590 B2 | 1/2007 | Pruvos et al. | |
| 7,162,615 B1 | 1/2007 | Gelinas et al. | |
| 7,240,165 B2 | 7/2007 | Tierney et al. | |
| 7,257,814 B1 | 8/2007 | Melvin et al. | |
| 7,353,340 B2 | 4/2008 | Hetherington et al. | |
| 7,577,822 B2* | 8/2009 | Vorbach | 712/34 |
| 7,739,476 B2* | 6/2010 | Pan et al. | 711/206 |
| 8,131,941 B2 | 3/2012 | Kinter | |
| 2001/0005873 A1 | 6/2001 | Yasuda et al. | |
| 2002/0129029 A1* | 9/2002 | Warner et al. | 707/100 |
| 2002/0133674 A1 | 9/2002 | Martin et al. | |
| 2004/0019891 A1* | 1/2004 | Koenen | 718/102 |
| 2004/0249880 A1* | 12/2004 | Vorbach | 709/200 |
| 2005/0053057 A1* | 3/2005 | Deneroff et al. | 370/360 |
| 2005/0071722 A1* | 3/2005 | Biles | 714/746 |
| 2006/0179429 A1* | 8/2006 | Eggers et al. | 717/151 |
| 2007/0043913 A1 | 2/2007 | Hetherington et al. | |
| 2007/0113053 A1 | 5/2007 | Jensen et al. | |
| 2009/0019232 A1* | 1/2009 | Deshpande et al. | 711/141 |
| 2009/0089510 A1 | 4/2009 | Lee et al. | |
| 2009/0248988 A1 | 10/2009 | Berg et al. | |
| 2009/0276578 A1* | 11/2009 | Moyer | 711/141 |
| 2010/0235579 A1* | 9/2010 | Biles et al. | 711/125 |
| 2010/0287342 A1* | 11/2010 | Greenberg et al. | 711/146 |

OTHER PUBLICATIONS

"CPU cache," from Wikipedia, retrieved from the internet on Nov. 10, 2007 at http://en.wikipedia.org/wiki/CPU_cache, pp. 1-16.

"Self-modifying code," from Wikipedia, retrieved from the internet on Nov. 10, 2007 at http://en.wikipedia.org/wiki/Self-modifying_code, pp. 1-5.

Drepper, Ulrich, "Memory part 2: CPU caches," retrieved from the internet on Nov. 10, 2007 at http://lwn.net/Articles_252125/, pp. 1-53.

Genua, P., "A cache primer," Freescale Semiconductor AN2663, Rev. 1, Oct. 2004, pp. 1-16.

McKenney, Paul E., "Memory ordering in modern microprocessors, Part II," created Jul. 28, 2005, retrieved from the internet on Jan. 3, 2008 at http://linuxjournal.com/print/8212, pp. 1-8.

MIPS32® 34K® Processor Core Family Software User's Manual, MIPS Technologies, Document No. MD00534, Revision 01.02, Dec. 19, 2006, 375 pages.

PCT International Search Report of the International Searching Authority for Application No. PCT/US2008/77084, Dated Dec. 15, 2008.

PCT Written Opinion of the International Searching Authority for Application No. PCT/US2008/77084, Dated Dec. 15, 2008.

Non-Final Office Action for U.S. Appl. No. 11/859,198, mailed on Jan. 22, 2010, 9 pages.

Non Final Office Action for U.S. Appl. No. 11/859,198, mailed on Oct. 6, 2010, 11 pages.

Final Office Action for U.S. Appl. No. 11/859,198, mailed on Jun. 21, 2011, 10 pages.

Notice of Allowance for U.S. Appl. No. 11/859,198, mailed on Oct. 26, 2011, 7 pages.

Non Final Office Action for U.S. Appl. No. 11/864,363, mailed on Jun. 10, 2010, 8 pages.

Final Office Action for U.S. Appl. No. 11/864,363, mailed on Feb. 17, 2011, 9 pages.

Final Office Action for U.S. Appl. No. 11/864,363, mailed on Feb. 21, 2012, 16 pages.

Non Final Office Action for U.S. Appl. No. 12/058,117, mailed on Sep. 2, 2010, 25 pages.

Non Final Office Action for U.S. Appl. No. 12/058,117, mailed on May 10, 2011, 8 pages.

PCT International Search Report and Written Opinion for Application No. PCT/US2009/038261, Jul. 1, 2009, 12 pages.

Chinese Office Action, Chinese Patent Application No. 200880108013.3, Feb. 15, 2012, 22 pages.

* cited by examiner

COHERENT INSTRUCTION CACHE UTILIZING CACHE-OP EXECUTION RESOURCES This application claims priority to U.S. Provisional Patent Application 61/013,265, entitled "COHERENT INSTRUCTION CACHE UTILIZING CACHE-OP EXECUTION RESOURCES", filed Dec. 12, 2007, and is related to U.S. patent application Ser. No. 11/859,198, filed Sep. 21, 2007, and entitled "SUPPORT FOR MULTIPLE COHERENCE DOMAINS," both of which are incorporated herein by reference.

BACKGROUND OF THE INVENTION

The present invention relates generally to cache management, and more particularly to maintaining cache coherence in a multiprocessor system.

Advances in semiconductor fabrication technology have given rise to considerable increases in microprocessor clock speeds. Although the same advances have also resulted in improvements in memory density and access times, there remains a disparity between microprocessor clock speeds and memory access times. To reduce latency, often one or more levels of high-speed cache memory are used to hold a subset of the data or instructions that are stored in the main memory. A number of techniques have been developed to increase the likelihood that the data/instructions held in the cache are repeatedly used by the microprocessor.

To improve performance at any given operating frequency, microprocessors with multiple cores that execute instructions in parallel have been developed. The cores may be integrated within the same semiconductor die, or may be formed on different semiconductor dies coupled to one another within a package, or a combination of the two. Each core may include its own level 1 cache which can store program data as well as instruction data (alternatively referred to as "instructions") and an optional level 2 cache.

BRIEF SUMMARY OF THE INVENTION

In accordance with one embodiment of the present invention, a method of maintaining cache coherence in a multiprocessor system having a plurality of processors coupled to a coherence manager is disclosed. The method includes receiving a command to perform a cache maintenance operation at a first processor in the multiprocessor system and detecting if the cache maintenance operation is a coherent operation. The method includes sending a coherent request to the coherence manager for distribution to the processors of the coherent domain and canceling execution of the cache maintenance operation at the first processor when the cache maintenance operation is detected as being a coherent operation. The method includes receiving a plurality of messages from the coherence manager, including at least one message corresponding to the coherent request. The method also includes executing the cache maintenance operation at the first processor based on the at least one message corresponding to the coherent request.

In another embodiment, a processor core adapted for use in a multiprocessor system having one or more coherent domains for maintaining cache coherence among a plurality of processor cores in each coherent domain is disclosed. The processor core includes an arithmetic logic unit that decodes a command to perform a cache maintenance operation. An instruction fetch unit is coupled to the arithmetic logic unit for receiving the cache maintenance operation. The instruction fetch unit can store the cache maintenance operation in a first buffer and can execute the stored cache maintenance operation. A load-store unit is also coupled to the arithmetic logic unit for receiving information about the cache maintenance operation. The load-store unit can determine when the cache maintenance operation is a coherent operation. A bus interface unit is coupled to the load-store unit and can generate a coherent request corresponding to the cache maintenance operation when the cache maintenance operation is determined to be a coherent operation. The bus interface unit can send the coherent request for distribution to processors in the coherent domain of the first processor core and can receive a plurality of coherence messages including at least one message corresponding to the coherent request. The command to perform the coherent cache maintenance operation can be executed at the processor core based on the at least one message corresponding to the coherent request.

In still another embodiment, a method of maintaining instruction cache coherence in a multiprocessor system comprising a plurality of processors that form a coherent domain is disclosed. The method includes receiving a command to invalidate a first cache line of an instruction cache of a first processor in the multiprocessor system and determining if the first cache line is associated with a coherent address space of the coherent domain. The method includes sending a coherent request to a first interface of the first processor for distribution to other processors in the coherent domain and canceling execution of the command at the first processor. The method also includes receiving a plurality of messages at a second interface of the first processor including operations for maintaining a data cache and the instruction cache of the first processor. At least one of the messages can correspond to the coherent request sent to the first interface. The method includes executing the messages corresponding to the coherent request at the first processor to invalidate the first cache line.

DETAILED DESCRIPTION OF THE INVENTION

Cache coherence refers to maintaining an internally consistent data set in one or more memory elements. For example, cache coherence requires that if a copy of a data item is modified in a cache memory, copies of the same data item stored in other processor caches are invalidated or updated in accordance with the modification. The goal is to manage change so that each processor has ready access to the most current information wherever it may be stored.

Maintaining cache coherence provides many advantages, but also consumes power, processing cycles, and bus bandwidth. In addition, the way in which cache coherence is managed can impact software development efforts and code complexity. Therefore, there is a need to maintain cache coherence in a multiprocessor environment in an efficient and software-friendly manner.

In accordance with embodiments of the present invention, a coherent cache operation performed by a requesting processor disposed in a multiprocessor system causes a coherent request to be sent to all other processors in the coherent domain of the requesting processor. Coherent cache operations can be low-level cache maintenance operations (alternatively referred to as "cacheops"). For example, cache maintenance operations can be generated in response to software instructions when new code or data is to be written to system memory. As described herein, changes at one processor are propagated to other processors within the coherent domain, greatly reducing the burden on software developers and providing an efficient, low-power, and low-bandwidth solution to achieving cache coherence in the multiprocessor system. Although the following description is provided primarily with reference to an instruction cache, it is understood that the present invention is equally applicable to a data cache.

Figure 1:
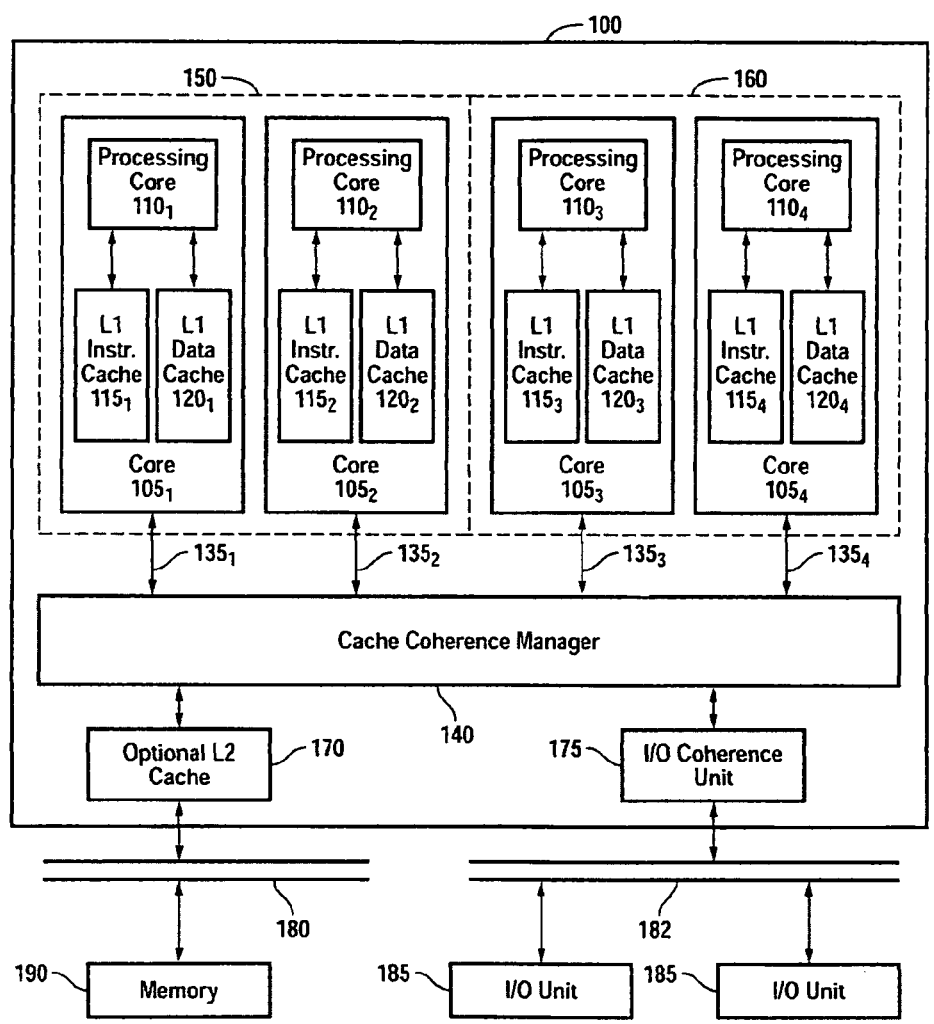
FIG. 1 is a high-level block diagram of a multi-core microprocessor in communication with I/O devices and a system memory in accordance with one embodiment of the present invention.

FIG. 1 is a block diagram of a microprocessor 100, in accordance with one exemplary embodiment of the present invention, that is in communication with system memory 190 and I/O units 185 via system bus 180 and peripheral bus 182, respectively. Microprocessor (hereinafter also referred to as "processor") 100 is shown as including, in part, four cores $105_1$, $105_2$, $105_3$ and $105_4$, a cache coherence manager 140, and an optional level 2 (L2) cache 170. Each core $105_i$, where i is an integer ranging from 1 to 4, is shown as including, in part, a processing core $110_i$, a Level 1 (L1) instruction cache $115_i$, and a L1 data cache $120_i$. Although shown with four cores, it is understood that other embodiments of processor 100 may include more or fewer than four cores.

Each processing core $110_i$ is adapted to perform a multitude of fixed or flexible sequences of operations in response to program instructions. Each processing core $110_i$ may conform to either CISC and/or RISC architectures to process scalar or vector data types using SISD or SIMD instructions. Each processing core $110_i$ may include general purpose and specialized register files and execution units configured to perform logic, arithmetic, and any other type of data processing functions. The processing cores $110_1$, $110_2$, $110_3$ and $110_4$, which are collectively referred to as processing cores 110, may be configured to perform identical functions, or may alternatively be configured to perform different functions adapted to different applications. Processing cores 110 may be single-threaded or multi-threaded, i.e., capable of executing multiple sequences of program instructions in parallel fashion.

Each core $105_i$ is shown as including L1 data and instruction caches. In other embodiments, each core $110_i$ may include more levels of cache, e.g., Level 2, Level 3, etc. Each L1 cache $115_i$, $120_i$ can be organized into a multitude of cache lines, with each line adapted to store a copy of the data corresponding with one or more virtual or physical memory addresses. Each cache line can also store additional information used to manage that cache line. Such additional information includes, for example, tag information used to identify the main memory address associated with the cache line, and cache coherency information used to synchronize the data in the cache line with other caches and/or with the main system memory. The cache tag may be formed from all or a portion of the memory address associated with the cache line.

As shown, each L1 cache $115_i$, $120_i$ is coupled to its associated processing core $110_i$ via a bus. Each bus can include a multitude of signal lines for carrying data and/or instructions. Further, each core $105_i$ includes cache control logic to facilitate data transfer to and from its associated data or instruction cache. Each L1 cache $115_i$, $120_i$ may be fully associative, set associative with two or more ways, or direct mapped and can be separately accessed by its associated processing core $110_i$.

Each core $105_i$ is coupled to cache coherence manager 140 via an associated interconnect $135_i$. Cache coherence manager 140 facilitates transfer of instructions and/or data between cores $105_i$, system memory 190, I/O units 185, and optional shared L2 cache 170. Cache coherence manager 140 establishes the global ordering of requests, sends intervention requests, collects the responses to such requests, and sends the requested data back to the requesting core. Cache coherence manager 140 orders the requests so as to optimize memory accesses, load balance the requests, give priority to one or more cores over the other cores, and/or give priority to one or more types of requests over the others.

In some embodiments, cache coherence manager 140 is configured to establish a multitude of coherent domains in processor 100. In the embodiment shown, the various cores disposed in processor 100 are partitioned to support two cache coherent domains. For example, cores $105_1$ and $105_2$ form a first coherent domain 150, and cores $105_3$ and $105_4$ form a second coherent domain 160. Because cores $105_1$ and $105_2$ are disposed in the same coherent domain 150, their respective instruction and data caches are maintained coherent with one another. Similarly, because cores $105_3$ and $105_4$ are disposed in the same coherent domain 160, their respective instruction and data caches are also maintained coherent with one another. However, no coherence exists between the respective caches of cores $105_1$, $105_2$ and cores $105_3$, $105_4$ because they are in different coherent domains. It is understood that coherence manager 140 can support an arbitrary number of coherent domains, ranging from all cores in a single coherent domain to each core in its own domain.

Each data cache line, for example each line within data cache $120_1$, can include data to facilitate coherence between, e.g., data cache $120_1$, main memory 190, and any other data cache $120_2$, $120_3$, $120_4$, intended to remain coherent with cache $120_1$ as part of its coherent domain. For example, in accordance with the MESI cache coherency protocol, each data cache line is marked as being modified "M", exclusive "E", Shared "S", or Invalid "I". Other data cache coherency protocols, such as MSI, MOSI, and MOESI coherency protocols, are also supported by the embodiments of the present invention.

Instruction cache coherence can be managed separately from data cache coherence and cache maintenance operations are initiated by software. For example, each core $105_i$ may be configured to selectively invalidate lines of its instruction cache $115_i$ in response to one or more commands to perform a cache operation. If the cache operation targets coherent instruction data, the core $105_i$ can send a coherent request to coherence manager 140. Coherence manager 140 can generate one or more intervention messages in response to the coherent request and can direct the intervention messages to each member of the coherent domain. The intervention messages from coherence manager 140 can reflect a global ordering of coherence traffic in the multiprocessor system and may include cache operations affecting both instruction and data cache elements. Cache operations which do not target coherent instruction data can be executed locally, without generating the coherent request.

Figure 2:
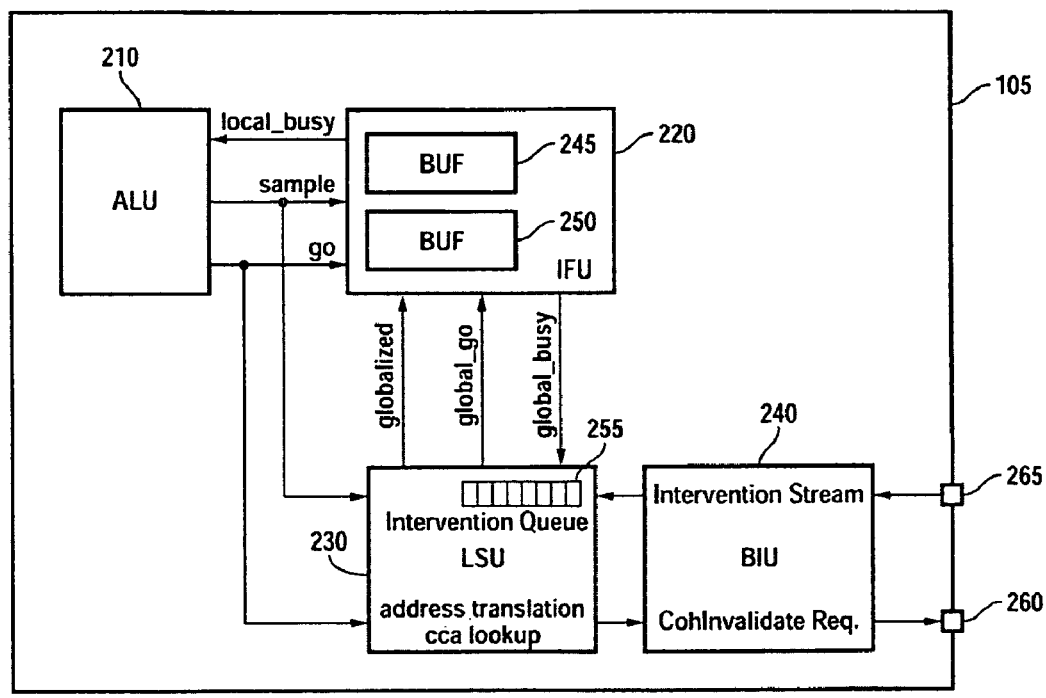
FIG. 2 is a block diagram showing various functional units of a processing core in accordance with embodiments of the present invention.

FIG. 2 depicts various functional units of a processor 105 according to one embodiment of the present invention. Processor 105 is shown as including, in part, an arithmetic logic unit (ALU) 210, an instruction fetch unit (IFU) 220, a load-store unit (LSU) 230, and a bus interface unit (BIU) 240. Processor 105 is also shown as having two communication ports which can serve as interfaces to other processors in a coherent domain via the coherence manager. Port 260 can be configured to carry coherence traffic from processor 105 to coherence manager 140, whereas port 265 can receive coherence traffic from coherence manager 140. In an exemplary embodiment, ports 260, 265 support open-core protocol (OCP) signaling with port 260 configured as a master port with respect to coherence manager 140 and port 265 configured as a slave port.

ALU 210 is responsible for decoding and executing a multitude of processor instructions. ALU 210 receives instructions and determines the manner in which they will be executed. Depending upon the type of instruction, ALU 210 may either execute it directly or coordinate its execution with other functional units of processor 105. For example, if the instruction is an arithmetic operation, such as an add or multiply, ALU 210 can execute the instruction and return a result. However, if the instruction is a cache operation, ALU 210 may not execute the instruction directly, but may instead coordinate its execution with IFU 220 and LSU 230 as discussed below.

In the embodiment shown, when ALU 210 determines that a decoded instruction is a cache maintenance operation, it asserts the sample signal that provides information about the instruction to IFU 220 and LSU 230. For example, ALU 210 may be pipelined such that cache instructions are sampled at an initial stage of the pipeline and executed at a subsequent stage. Cache operations in the pipeline may or may not be valid when they reach the execution stage such as can occur when the pipelined instructions are canceled by exceptions or other superseding events. ALU 210 signifies that a valid cache maintenance operation has reached the execution stage by asserting the go signal.

In response to the sample signal, IFU 220 can store a copy of the cacheop instruction in buffer 245. The cacheop instruction remains speculative until ALU 210 asserts the go signal and, as discussed below, its execution by IFU 220 can also be affected by the globalized signal from LSU 230. IFU 220 can control the flow of instructions from ALU 210 to buffer 245 with the local_busy signal. By asserting the local_busy signal, for example, IFU 220 can indicate that it is executing a cacheop and cannot receive additional cache operations at buffer 245. Deasserting local_busy can indicated that execution is complete and that IFU 220 can receive additional cacheops.

To process a cache operation, core 105 first determines its scope. Referring again to FIG. 1, suppose that code executing at processor $105_1$ modifies instructions by performing a store operation. The modified instructions may relate only to core $105_1$. In this sense, the changes are local to the processor at which they originated. However, the changes might also affect instructions used at other cores such as when the instructions are associated with a coherent address space of the coherent domain. If other processors in the coherent domain have stored the instructions in their respective instruction caches, the corresponding cache lines must be invalidated. For example, coherent domain 150 includes both core $105_1$ and core $105_2$. Thus, if core $105_1$ changes common instructions, microprocessor 100 propagates the changes to core $105_2$ so that instruction cache $115_1$ and instruction cache $115_2$ are maintained in a coherent state. Otherwise, the instructions at cache $115_2$ could become stale.

Figure 3:
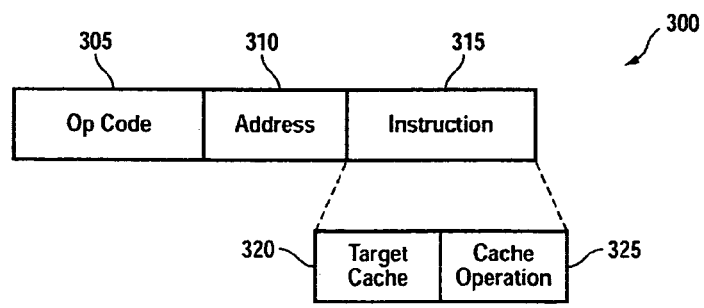
FIG. 3 depicts an exemplary cache operation instruction in accordance with embodiments of the present invention.

FIG. 3 shows an exemplary cacheop instruction 300 such as might be used to invalidate instruction cache data. As shown, cacheop 300 includes op code 305, address 310, and instruction 315. Op code 305, for example, can signify to ALU 210 that the instruction is a cacheop. Address 310 includes the address of the memory space to be affected by the cacheop. In some embodiments, address 310 includes virtual address information such as a virtual page number and an offset value. Instruction 315 can include details of the cache operation. As shown, instruction 315 can specify a target cache 320 and an operation 325 to be performed on the target cache. For example, instruction 315 may indicate that the cacheop is directed to the primary instruction cache (e.g., $115_1$) and that the line corresponding to address 310 should be invalidated from the cache. Alternatively, the instruction may specify more than one cache operation by, for example, directing writeback of a data cache line and invalidating an instruction cache line that corresponds to the writeback address.

Returning to FIG. 2, LSU 230 can receive the cacheop from ALU 210 and determine whether it is a coherent operation that should be propagated to other cores in the coherent domain or a non-coherent operation which should be executed locally without being propagated. LSU 230 communicates the results of this determination to IFU 220 through the globablized signal. The go signal from ALU 210 indicates that the cacheop in buffer 245 has reached the execution stage and that it should be executed. If the globalized signal indicates that the cacheop is non-coherent, IFU 220 can execute the instruction in buffer 245 and complete processing of the cacheop. For example, core 105 may proceed to invalidate a line from its instruction cache. However, if the instruction is both valid and coherent, IFU 220 can release buffer 245 without executing the cacheop. In other words, execution of the cacheop can be canceled and the contents of buffer 245 can be discarded when a coherent instruction is detected.

In one embodiment, LSU 230 determines whether a cacheop instruction is coherent or non-coherent by performing an address translation and lookup operation. LSU 230 may include a translation lookaside buffer (TLB) which retrieves attributes corresponding to the virtual address (e.g., address 310) of the cacheop instruction. The attributes may include a cache coherence attribute (CCA) for each address stored in the instruction cache. Based upon the CCA information, LSU 230 determines if the address is part of a coherent address space or if it is local to processor 105. The TLB can also convert the virtual address of the instruction into a physical address of the multiprocessor system.

For coherent operations, LSU 230 notifies other processors in the coherent domain that instructions at a coherent address will be modified. In some embodiments, LSU 230 sends information about the cacheop to BIU 240. BIU 240 includes the interface to both ports 260, 265 and can send coherence messages for distribution to other processors in the coherent domain. In one embodiment, BIU 240 generates a coherent request using information from LSU 230 and sends the coherent request to coherence manager 140. As shown, the coherent request may be a coherent invalidate (CohInvalidate) request and may include one or more addresses to invalidate within the address space of the coherent domain.

At this point, processor 105 has received a cacheop, determined that it is valid and coherent, and sent a coherent request including one or more coherent cache operations for distribution to other processors in its coherent domain. In some embodiments, processor 105 then executes the instruction at IFU 220 without further coherence traffic.

In some embodiments, a self-intervention approach is used. Rather than executing the cacheop directly, processor 105 can instead wait to receive intervention messages from the coherence manager. Coherence manager 140 can respond to coherent requests by sending an intervention to each core, including the requesting core, in the coherent domain. When a core receives an intervention in response to a coherent request that the core itself originated, the intervention is referred to as a self-intervention. In one embodiment, coherence manager 140 receives coherence traffic from all cores in the microprocessor and outputs a serialized intervention stream. The intervention stream may reflect a global ordering of interventions within each coherent domain or across the entire microprocessor.

When received at the intervention port 265, the self-intervention can be communicated from BIU 240 to LSU 230. In some embodiments, the self-intervention may include one or more coherent cache operations which may be stored in an intervention queue 255 of LSU 230. The intervention queue 255 can store coherent operations targeting the instruction cache as well as the data cache. Coherence traffic in intervention queue 255 can be processed in the order it was received. However, it will be recognized that the present embodiment is not limited to a particular queuing and/or FIFO policy, but may instead buffer coherent operations and establish a processing order based upon priority or the type of operations.

When the coherent operations reach the head of intervention queue 255, they can be transferred from LSU 230 to IFU 220 and stored in buffer 250. Signal global_go can trigger execution of the cacheop in buffer 250. During execution of a coherent cacheop, IFU 220 can assert signal global_busy. Signal global_busy can be used to maintain flow control to the intervention queue 255 and to notify LSU 230 when IFU 220 has finished execution of a cacheop. In some embodiments, LSU 230 sends an acknowledgement message through BIU 240 to coherence manager 140 when it is notified that execution of the coherent cacheop is complete.

Figure 4:
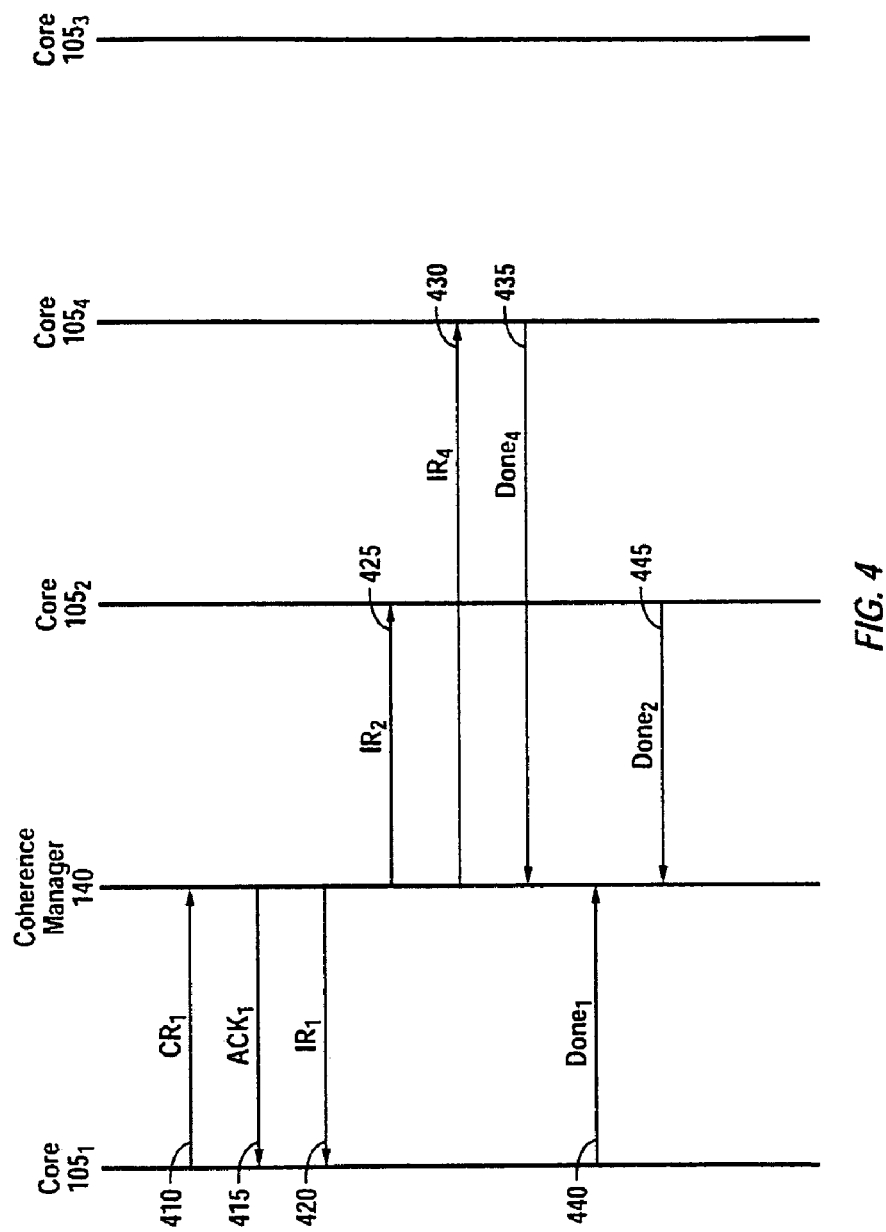
FIG. 4 is a diagram showing coherence traffic exchanged between processors and a coherence manager in accordance with one embodiment of the present invention.

FIG. 4 is a diagram showing coherence traffic exchanged between processors $105_i$ and coherence manager 140 in accordance with one embodiment of the present invention. For purposes of illustration, it is assumed that processors $105_1$, $105_2$, and $105_4$ are part of the same coherent domain and that processor $105_3$ is not in the coherent domain. At 410, core $105_1$ sends coherent request $CR_1$ to coherence manager 140. $CR_1$ may represent a coherent writeback instruction generated in response to new instructions having been stored in the data cache of core $105_1$, a coherent invalidate instruction for invalidating instruction cache lines that correspond to new instructions, or a combination of these operations. In some embodiments, related data and instruction cache operations may be combined into a single synchronization instruction.

At 415, coherence manager 140 optionally acknowledges to core $105_1$ that the coherent request is received by sending acknowledgement message $ACK_1$. In embodiments where core $105_1$ is not configured to process self-intervention messages, receipt of the acknowledgement message may trigger execution of the local cacheop. For example, IFU 220 may delay execution of a pending coherent cacheop until its coherent request has been acknowledged by the coherence manager. In such a case, the local cacheop may be maintained in buffer 245 and the globalized signal may be deasserted upon receipt of the acknowledgement.

In response to the coherent request, coherence manager 140 sends intervention messages to each core $105_i$ in the coherent domain. As shown at 425-430, coherence manager 140 sends external intervention $IR_2$ to core $105_2$ and sends external intervention $IR_3$ to core $105_3$. Note that no intervention is sent to core $105_3$ because core $105_3$ is not within the coherent domain. At 420, coherence manager 140 sends intervention $IR_1$ to core $105_1$. Intervention $IR_1$ is a self-intervention because it corresponds to coherent request $CR_1$ generated by core $105_1$. Each intervention can include at least one coherent address as well as one or more cacheops for instruction cache coherence. It will be understood that interventions $IR_1$, $IR_2$, $IR_4$ may be separately addressed or broadcast to the coherent domain and that they may be sent at the same time or at different times. Also, it will be understood that the particular ordering of $IR_1$, $IR_2$, $IR_4$ may change in accordance with a global intervention order established by coherence manager 140.

As shown, each processor in the coherent domain $105_1$, $105_2$, $105_4$, acknowledges execution of the intervention cacheops that correspond to the coherent request. In some embodiments, an acknowledgement message $DONE_1$, $DONE_2$, $DONE_4$ is sent to coherence manager 140 indicating that the core is committed to executing the coherent operations. In other embodiments, the acknowledgment is sent only after the cacheops have been fully executed. For example, after transferring a coherent cacheop from its intervention queue, each processor may monitor its execution and generate an acknowledgement message (DONE) when it has completed. At 435-445, cores $105_1$, $105_2$, and $105_4$ acknowledge completion at different times depending upon the contents of their respective intervention queues.

Figure 5A:
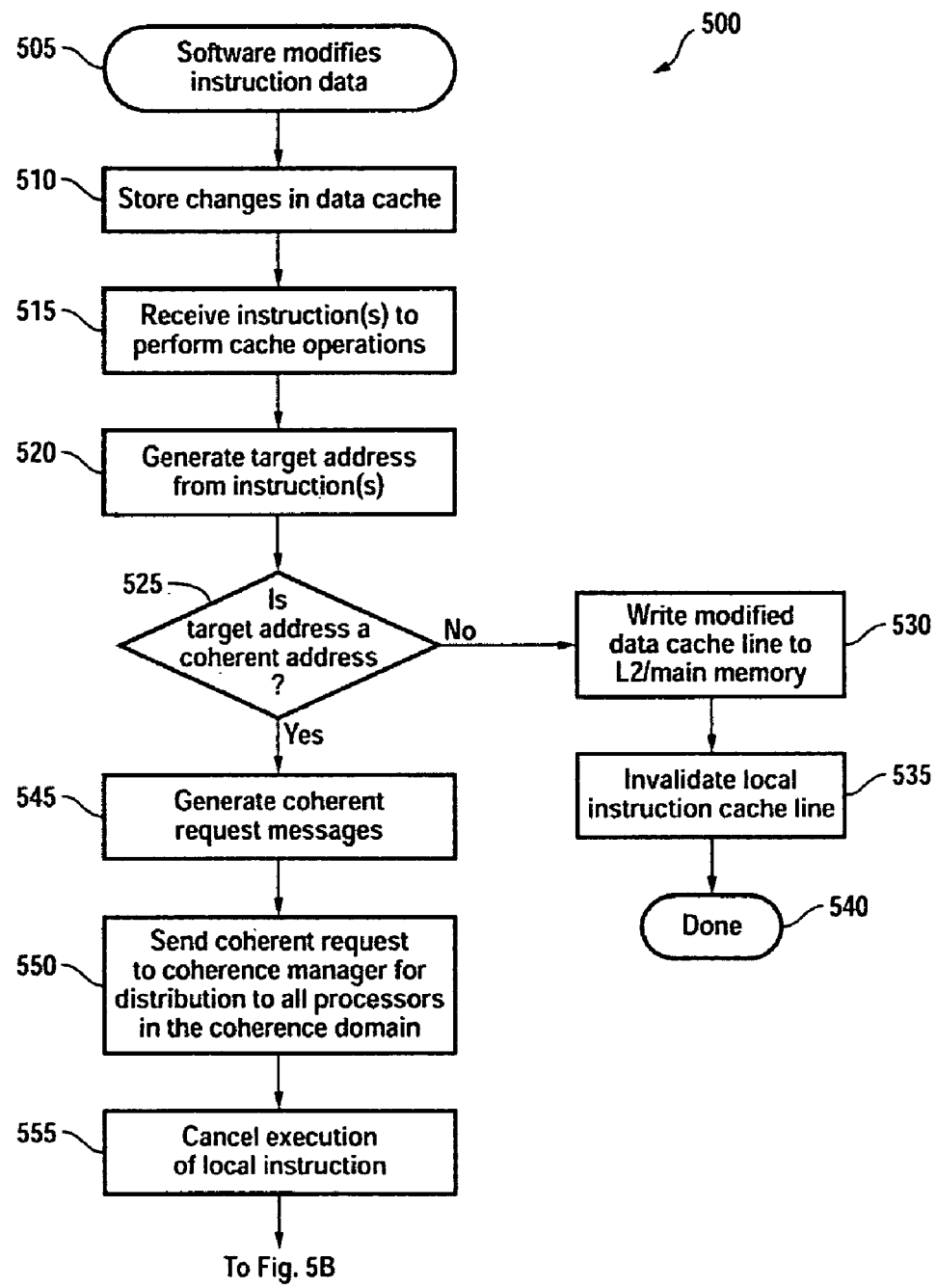
FIG. 5 is a flowchart of instruction cache coherence processing in accordance with an embodiment of the present invention.
Figure 5B:
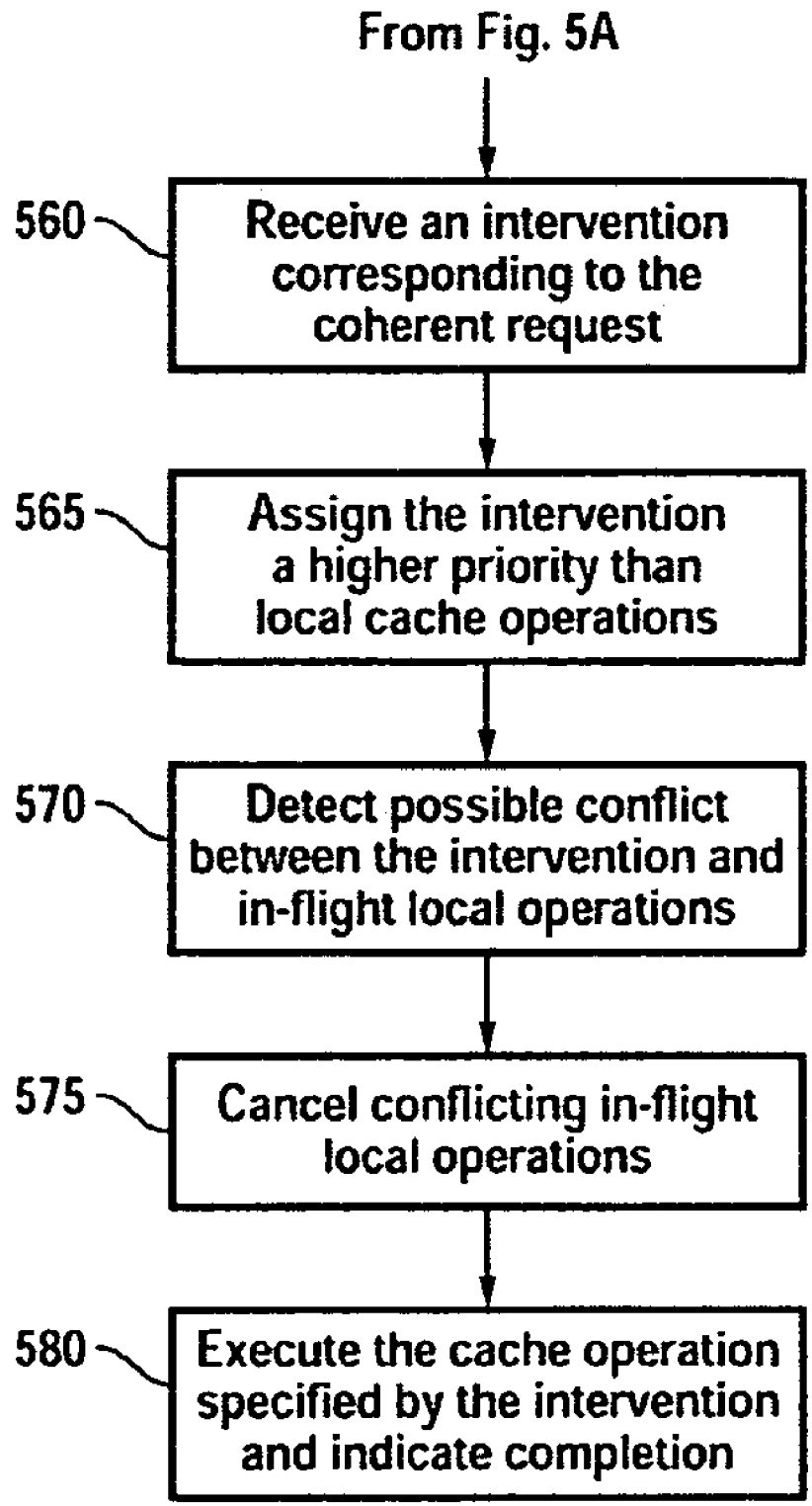

FIG. 5 is a flowchart of steps for maintaining instruction cache coherence 500 in accordance with an exemplary embodiment of the present invention. Instruction cache coherence processing 500, for example, may be performed at each processor in a multiprocessor system or it may be built-in to an intellectual property processing core intended for use in a multiprocessor system. It will be recognized that the steps shown (505-580) are for illustrative purposes only and that coherence processing 500 may utilize more or fewer steps or a different ordering of steps in accordance with various embodiments of the invention.

At step 505, software modifies instruction data or changes instructions that will be executed at a processor. For example, a multi-threaded application running on several processors in a coherent domain may execute a block of self-modifying code, or a just-in-time compiler may translate bytecode instructions into machine code before execution thus creating new instructions. Alternatively, instructions may be modified by an I/O unit, for example, through a direct memory access (DMA) operation such as when loading data from a disk into main memory.

At step 510, the modified instructions are stored in the processor's data cache. Next, one or more cache maintenance instructions are received (step 515) in connection with the modified instruction data. These instructions may include separate writeback and invalidate instructions for causing the modified data cache line to be written back to main memory and for invalidating the instruction cache line containing a copy of the unmodified/stale instructions. In some embodiments, these related cache operations are combined into a single instruction for synchronizing the instruction cache following changes to the instruction data.

At step 520, a target address is generated. For example, the synchronization instruction may reference a virtual address used by the software application. Next, at step 525, it can be determined whether the virtual address is part of a coherent address space belonging to the processor's coherent domain. If the address is not a coherent address, local cache lines can be updated prior to finishing processing. This may include writing the modified data cache line to memory or secondary caches (step 530) and invalidating the cache line associated with the non-coherent address in the local instruction cache (step 535).

If the cacheops target a coherent address, they will be propagated to other processors in the coherent domain. At step 545, a coherent request is generated, and at step 550, the coherent request is sent for distribution to all processors in the coherent domain. In the present embodiment, the processor that sent the coherent request waits to receive an intervention corresponding to the coherent request. Thus, at step 555, execution of the original instruction is canceled.

At steps 560-565, the self-intervention is received for processing and assigned a higher priority than local cache operations. In some embodiments, a finite state machine is used to prioritize cache operations. For example, to avoid potential conflicts between a coherent cache operation and a pending non-coherent cache operation, the coherent cache operation may be assigned a higher priority. In an exemplary embodiment, coherent cache maintenance operations are executed before non-coherent cache maintenance operations and other cache operations such as fill/fetch operations.

In addition to prioritizing coherent cache operations, at step 570, the processor detects whether a conflict exists between in-flight local operations and the coherent cache operation. A conflict may exist, for example, if the local operation and the coherent operation address the same cache line, if their order of execution matters, and if at least one of them is a store operation. Prior to executing the coherent instruction, at step 575, the processor resolves in-flight, conflicting operations either by canceling them or allowing them to complete. This ensures full execution of the coherent operations and can avoid deadlock situations. When the coherent instruction has been prioritized and potential conflicts are resolved, the cache operation can be executed (step 580) and the processor can signal that execution is complete. In one embodiment, other processors in the coherent domain perform similar steps upon receiving an external intervention corresponding to the coherent request thereby achieving instruction cache coherence within the coherent domain.

Figure 6:
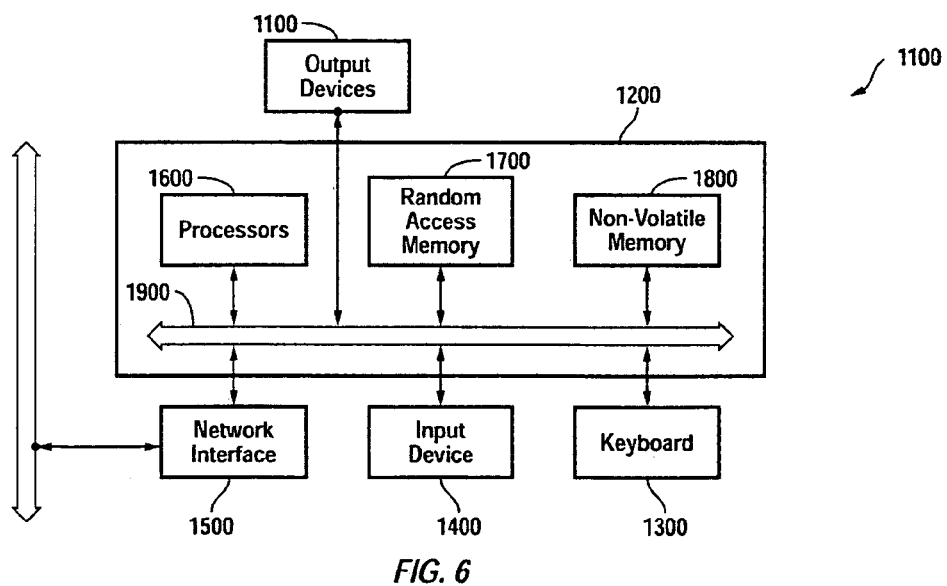
FIG. 6 shows an exemplary computer using a multiprocessor system according to embodiments of the present invention.

FIG. 6 illustrates an exemplary computer system 1000 in which the present invention may be embodied. Computer system 1000 typically includes one or more output devices 1100, including display devices such as a CRT, LCD, OLED, LED, gas plasma, electronic ink, or other types of displays, speakers and other audio output devices; and haptic output devices such as vibrating actuators; computer 1200; a keyboard 1300; input devices 1400; and a network interface 1500. Input devices 1400 may include a computer mouse, a trackball, joystick, track pad, graphics tablet, touch screen, microphone, various sensors, and/or other wired or wireless input devices that allow a user or the environment to interact with computer system 1000. Network interface 1500 typically provides wired or wireless communication with an electronic communications network, such as a local area network, a wide area network, for example the Internet, and/or virtual networks, for example a virtual private network (VPN). Network interface 1500 can implement one or more wired or wireless networking technologies, including Ethernet, one or more of the 802.11 standards, Bluetooth, and ultra-wideband networking technologies.

Computer 1200 typically includes components such as one or more general purpose processors 1600, and memory storage devices, such as a random access memory (RAM) 1700 and non-volatile memory 1800. Non-volatile memory 1800 can include floppy disks; fixed or removable hard disks; optical storage media such as DVD-ROM, CD-ROM, and bar codes; non-volatile semiconductor memory devices such as flash memories; read-only-memories (ROMS); battery-backed volatile memories; paper or other printing mediums; and networked storage devices. System bus 1900 interconnects the above components. Processors 1600 may be a multi-processor system such as multi-processor 100 described above.

RAM 1700 and non-volatile memory 1800 are examples of tangible media for storage of data, audio/video files, computer programs, applet interpreters or compilers, virtual machines, and embodiments of the present invention described above. For example, the above described embodiments of the processors of the present invention may be represented as human-readable or computer-usable programs and data files that enable the design, description, modeling, simulation, testing, integration, and/or fabrication of integrated circuits and/or computer systems. Such programs and data files may be used to implement embodiments of the invention as separate integrated circuits or used to integrate embodiments of the invention with other components to form combined integrated circuits, such as microprocessors, microcontrollers, system on a chip (SoC), digital signal processors, embedded processors, or application specific integrated circuits (ASICs).

Programs and data files expressing embodiments of the present invention may use general-purpose programming or scripting languages, such as C or C++; hardware description languages, such as VHDL or Verilog; microcode implemented in RAM, ROM, or hard-wired and adapted to control and coordinate the operation of components within a processor or other integrated circuit; and/or standard or proprietary format data files suitable for use with electronic design automation software applications known in the art. Programs and data files can express embodiments of the invention at various levels of abstraction, including as a functional description, as a synthesized netlist of logic gates and other circuit components, and as an integrated circuit layout or set of masks suitable for use with semiconductor fabrication processes. These programs and data files can be processed by electronic design automation software executed by a computer to design a processor and generate masks for its fabrication.

Further embodiments of computer 1200 can include specialized input, output, and communications subsystems for configuring, operating, simulating, testing, and communicating with specialized hardware and software used in the design, testing, and fabrication of integrated circuits.

Although some exemplary embodiments of the present invention are described with reference to a processor having four cores, it is understood that the processor may have more or fewer than four cores. The arrangement and the number of the various devices shown in the block diagrams are for clarity and ease of understanding. It is understood that combinations of blocks, additions of new blocks, re-arrangement of blocks, and the like fall within alternative embodiments of the present invention. For example, any number of I/Os, coherent multi-core processors, system memories, L2 and L3 caches, and non-coherent cached or cacheless processing cores may also be used.

It will be appreciated that the apparatus and methods described herein may be included in a semiconductor intellectual property core, such as a microprocessor core (e.g. expressed as a hardware description language description or a synthesized netlist) and transformed to hardware in the production of integrated circuits. Additionally, the embodiments of the present invention may be implemented using combinations of hardware and software, including micro-code suitable for execution within a processor.

The above embodiments of the present invention are illustrative and not limitative. Various alternatives and equivalents are possible. The invention is not limited by the type of integrated circuit in which the present disclosure may be disposed. Nor is the invention limited to any specific type of process technology, e.g., CMOS, Bipolar, BICMOS, or otherwise, that may be used to manufacture the various embodiments of the present invention. Other additions, subtractions or modifications are obvious in view of the present invention and are intended to fall within the scope of the appended claims.

What is claimed is:

1. A method of maintaining cache coherence in a multi-core processor comprising a plurality of cores coupled to a cache coherence manager, each core having a processing core and an associated cache, the method comprising:
receiving a command to perform a cache maintenance operation at a first processing core in the multi-core processor;
detecting if the cache maintenance operation is a coherent operation;
sending a coherent request to the cache coherence manager for distribution to one or more of the processing cores that are in a coherent domain of the first processing core, and canceling execution of the cache maintenance operation at the first processing core when the cache maintenance operation is detected as being a coherent operation;
receiving a plurality of messages from the cache coherence manager, the plurality of messages including at least one message corresponding to the coherent request; and
executing the cache maintenance operation at the first processing core based on the at least one message corresponding to the coherent request.

2. The method of claim 1, further comprising executing the cache maintenance operation at the first processing core without sending the coherent request when the cache maintenance operation is not detected as being a coherent operation.

3. The method of claim 1, wherein the cache maintenance operation includes a virtual memory address, the method further comprising retrieving one or more attributes associated with the virtual memory address and determining if the cache maintenance operation is a coherent operation based on the one or more attributes.

4. The method of claim 3, further comprising translating the virtual memory address associated with the cache maintenance operation into a physical address of the multi-core processor.

5. The method of claim 1 wherein the command to perform the cache maintenance operation is stored in a buffer and the messages received from the cache coherence manager are stored in a global priority queue.

6. The method of claim 5, further comprising processing messages in the global priority queue before processing commands in the buffer.

7. The method of claim 1 wherein the cache maintenance operation comprises one or more instructions for writing a first data cache line to a memory location and invalidating a first instruction cache line corresponding to the memory location.

8. The method of claim 1 wherein the plurality of messages are received from the cache coherence manager according to a global ordering of the multi-core processor, the method further comprising processing the plurality of messages in the order that they are received.

9. The method of claim 1 wherein the plurality of messages comprise cache maintenance operations associated with a data cache and cache maintenance operations associated with an instruction cache of the first processing core.

10. The method of claim 1 wherein each processing core in the coherent domain receives the at least one message corresponding to the coherent request and executes the cache maintenance operation to achieve cache coherence within the coherent domain.

11. A first processing core adapted for use in a multi-core processor having one or more coherent domains for maintaining cache coherence among a plurality of cores in each coherent domain, each core having a processing core and an associated cache, the first processing core comprising:
an arithmetic logic unit configured to decode a command to perform a cache maintenance operation;
an instruction fetch unit coupled to the arithmetic logic unit for receiving the cache maintenance operation, the instruction fetch unit configured to store the cache maintenance operation in a first buffer and to execute the stored cache maintenance operation;
a load-store unit coupled to the arithmetic logic unit for receiving information about the cache maintenance operation and configured to determine when the cache maintenance operation is a coherent operation; and
a bus interface unit coupled to the load-store unit and configured to generate a coherent request corresponding to the cache maintenance operation when the cache maintenance operation is determined to be a coherent operation, to send the coherent request for distribution to cores in the coherent domain of the first processing core at a first interface to the multi-core processor, and to receive a plurality of coherence messages including at least one message corresponding to the coherent request at a second interface to the multi-core processor,
wherein the instruction fetch unit is configured to execute the cache maintenance operation at the first processing core based on the at least one message corresponding to the coherent request.

12. The first processing core of claim 11 wherein the instruction fetch unit executes the stored cache maintenance operation when the load-store unit determines that the cache maintenance operation is a non-coherent operation.

13. The first processing core of claim 11 wherein the instruction fetch unit discards the cache maintenance operation from the first buffer and executes the at least one message corresponding to the coherent request from a second buffer.

14. The first processing core of claim 11 wherein the load-store unit comprises an address translator configured to translate a virtual address associated with the cache maintenance operation into a physical address of the multi-core processor.

15. The first processing core of claim 14 wherein the address translator is configured to retrieve one or more attributes associated with the virtual address, and wherein the load-store unit determines if the cache maintenance operation is a coherent operation based on the one or more attributes.

16. The first processing core of claim 11 wherein the plurality of messages comprise coherent instruction and data cache operations, and wherein instruction fetch unit executes the coherent instruction and data cache operations at a higher priority than commands in the first buffer.

17. The first processing core of claim 11 wherein the cache maintenance operation comprises one or more instructions for writing a first data cache line to a memory location and invalidating a first instruction cache line corresponding to the memory location.

18. A method of maintaining instruction cache coherence in a multi-core processor comprising a plurality of cores that form a coherent domain, each core having a processor and an associated cache, the method comprising:

receiving a command to invalidate a first cache line of an instruction cache of a first processing core in the multi-core processor;

determining if the first cache line is associated with a coherent address space of the coherent domain;

sending a coherent request to a first interface of the first processing core for distribution to other cores in the coherent domain and canceling execution of the command at the first processing core when it is determined that the first cache line is associated with the coherent address space;

receiving a plurality of messages at a second interface of the first processing core, the plurality of messages including operations for maintaining a data cache and the instruction cache of the first processing core, wherein at least one of the messages corresponds to the coherent request sent to the first interface;

executing the at least one of the messages corresponding to the coherent request at the first processing core to invalidate the first cache line; and invalidating a cache line in each of the other cores in the coherent domain in response to the coherent request.

19. The method of claim 18, further comprising invalidating the first cache line without sending the coherent request when it is determined that the first cache line is not associated with the coherent address space.

20. The method of claim 18, wherein canceling execution of the command to invalidate the first cache line is performed prior to receiving the at least one message corresponding to the coherent request when it is determined that the first cache line is associated with the coherent address space.

* * * * *